US008753195B2

(12) United States Patent
Oakes

(10) Patent No.: US 8,753,195 B2
(45) Date of Patent: Jun. 17, 2014

(54) SYSTEMS AND METHODS FOR PROCESSING SOFTWARE OBJECTS IN CONNECTION WITH A MAP-BASED GAMEBOARD

(71) Applicant: James Allan Oakes, London (GB)

(72) Inventor: James Allan Oakes, London (GB)

(73) Assignee: Geonomics Global Games Limited, London (GB)

(*) Notice: Subject to any disclaimer, the term of this patent is extended or adjusted under 35 U.S.C. 154(b) by 0 days.

(21) Appl. No.: 13/684,193

(22) Filed: Nov. 22, 2012

(65) Prior Publication Data

US 2013/0150139 A1 Jun. 13, 2013

Related U.S. Application Data

(60) Provisional application No. 61/563,379, filed on Nov. 23, 2011.

(51) Int. Cl.
*A63F 13/00* (2014.01)

(52) U.S. Cl.
USPC .................................. 463/25; 463/17; 463/42

(58) Field of Classification Search
USPC .......................................... 463/31–42, 17–25
See application file for complete search history.

(56) References Cited

U.S. PATENT DOCUMENTS

| | | | | |
|---|---|---|---|---|
| 7,300,348 | B2 * | 11/2007 | Kaminkow et al. | 463/17 |
| 2003/0047869 | A1 | 3/2003 | Walker et al. | |
| 2003/0114211 | A1 * | 6/2003 | White | 463/17 |
| 2004/0180713 | A1 | 9/2004 | Eklund | |
| 2004/0192438 | A1 * | 9/2004 | Wells et al. | 463/29 |
| 2004/0259626 | A1 * | 12/2004 | Akram et al. | 463/17 |
| 2006/0079331 | A1 * | 4/2006 | Moshal | 463/42 |
| 2006/0093142 | A1 * | 5/2006 | Schneier et al. | 380/251 |
| 2009/0197684 | A1 * | 8/2009 | Arezina et al. | 463/42 |
| 2011/0045909 | A1 * | 2/2011 | Cole | 463/42 |
| 2012/0077569 | A1 * | 3/2012 | Watkins et al. | 463/25 |
| 2012/0214571 | A1 * | 8/2012 | Oakes et al. | 463/17 |
| 2013/0095914 | A1 * | 4/2013 | Allen et al. | 463/25 |

OTHER PUBLICATIONS

International Search Report, PCT/IB2012/002713; International Filing Date Nov. 22, 2012.

International Search Report and Written Opinion from International Application No. PCT/IB2013/000788, 7 pages, Sep. 4, 2013.

(Continued)

*Primary Examiner* — Masud Ahmed
(74) *Attorney, Agent, or Firm* — Goodwin Procter LLP

(57) ABSTRACT

Systems and methods for processing software objects in connection with a map-based game are disclosed. Embodiments of the presently disclosed invention provide players with the ability to participate in a map-based game that offers prizes or discovery in the form of software applications upon his or her selection of one or more grid units in a map-based game. For example, in a map-based game, one or more of the units on the gameboard may have embedded therein one or more Apps that, when selected by the player, cause the application to be executed, unlocking aspects or features of the map-based game or providing players with entertainment, advertisements, promotional information, education, social networking, games, or utility functions.

30 Claims, 10 Drawing Sheets

(56) References Cited

OTHER PUBLICATIONS

EPO: "Mitteilung des Europäischen Patentamts vom 1. Oct. 2007 über Geschäftsmethoden = Notice from the European Patent Office dated Oct. 1, 2007 concerning business methods = Communiqué de l 'Office eoropéen des brevets, en date du ler Oct. 2007, concernant les methods dans le domaine des activitës", Journal Officiel De L'Office Europeen Des Brevets. Official Journal of the European Patent Office. Amtsblattt Des Eoropaeischen Patentamts, OEB, Munchen, DE, vol. 30, No. 11, Nov. 1, 2007, pp. 592-593, XP007905525, ISSN: 0170-9291, the whole document, 2 pages.
Webpage "The UK Postcode Lottery—FAQ—How to Play" dated Sep. 28, 2006, retrieved from http://web.archive.org/web/20060928125608/https://www.postcodelottery.co.uk/web/show/id=43883.
Webpage "The UK Postcode Lottery—How to play" dated Sep. 28, 2006, retrieved from http://web.archive.org/web/20060928115112/https://www.postcodelottery.co.uk/web/show/id=41266.
Webpage "Svenska PostkodStiftelsen—Swedish Postcode Lottery" retrieved from http://www.postkodstiftelsen.se/About-the-foundationNew/Swedish-Postcode-Lottery.htm, Sep. 28, 2006.
Webpage "Novamedia—Sweden" retrieved from http://www.novamedia.nl/web/Our-Charity-Lotteries/Sweden.htm, Sep. 28, 2006.
Webpage "Dutch Postcode Lottery" retrieved from http://www.carmabi.org/sponsors-partners/dutch-postcode-lottery, Sep. 28, 2006.
Webpage "Novamedia—NPL tekst" retrieved from http://www.novamedia.nl/web/Our-Charity-Lotteries/The-Netherlands/NPL-tekst.htm, Sep. 28, 2006.

* cited by examiner

SYSTEMS AND METHODS FOR PROCESSING SOFTWARE OBJECTS IN CONNECTION WITH A MAP-BASED GAMEBOARD

REFERENCES TO RELATED APPLICATIONS

This application hereby claims priority to and incorporates by reference U.S. Provisional Application Ser. No. 61/563,379 filed on Nov. 23, 2011, entitled "Systems And Methods for Processing Software Objects in Connection with a Map-Based Gameboard." This patent application further claims the benefits of PCT International Application No. PCT/US12/47377 (now PCT/IB2012/001552) with an International Filing Date of Jul. 19, 2012, entitled Systems and Methods for Prize Discovery Games, patent application Ser. No. 13/189,248 filed on Jul. 22, 2011, entitled "Systems and Methods for Prize Discovery Games," which is a Continuation-in-Part application of U.S. patent application Ser. No. 12/180,163, filed on Jul. 25, 2008, entitled "Systems and Methods for Lottery-Style Games" and U.S. patent application Ser. No. 12/180,201, filed on Jul. 25, 2008, also entitled "Systems and Methods for Lottery-Style Games." These applications are incorporated by reference in their entireties.

FIELD OF THE INVENTION

Embodiments of the present invention relate generally to games of chance. More specifically, the present invention relates to systems and methods for processing software applications and/or objects in connection with games of chance based on a map-based gameboard.

BACKGROUND OF THE INVENTION

In various embodiments of the previously disclosed GeoSweep, Treasure Hunt and Free2Play game, the prizes that players may win, e.g., by "owning" one or more selected grid units, are limited to real-world prizes or in-game bonuses. Even in the Treasure Hunt embodiments, the players' winnings for digging a particular grid unit are restricted to similar types of prizes. Furthermore, the manner in which these prizes or in-game bonuses may be won is fairly limited—e.g., by selecting one particular grid unit over another. As a result, players may get bored with the game over time or may not be sufficiently motivated by the game or the potential prizes to continue to play the game.

Accordingly, there is a need to provide the players with a more dynamic gaming environment and user experience by offering additional ways to play games such as the map-based GeoSweep, Treasure Hunt or Free2Play. Players, in return, may be more satisfied by finding the game more engaging and appealing, even after multiple rounds. As an additional benefit, these new gaming features may interest players unfamiliar with the game, further increasing the fan base.

Additionally, there is a need to offer additional types of prizes beyond those currently available and to allow other interactions between users and the map-based gameboard. This would not only provide players with a greater incentive to play, but it may also provide the players with additional motivation to return to the game after each iteration of GeoSweep, Treasure Hunt or other map-based games.

SUMMARY OF PREFERRED EMBODIMENTS

Systems and methods for processing software objects in connection with a map-based gameboard are disclosed.

Embodiments of the presently disclosed invention provide players with the ability to participate in a map-based game that offers prizes or discovery (or surprise) in the form of software applications (hereinafter generally referred to as "Apps") upon his or her selection of one or more units in a gameboard of the map-based game. For example, in a GeoSweep, Treasure Hunt, or other map-based games, as played on a mobile device or other computing platforms containing a graphical user interface, one or more of the grid units may have embedded therein one or more Apps that, when selected by the player, cause an App to be executed and displayed to the player. There may be any number or type of Apps on the map-based gameboard, effectively giving players access to a marketplace of applications with endless potential. The Apps may enhance the underlying GeoSweep, Treasure Hunt, or other map-based games or may serve informational, recreational, promotional, entertainment or commercial purposes as well. These Apps may but need not be related to the map-based game at all.

One aspect of the present invention includes computer-implemented methods for facilitating a map-based game. In one embodiment, the computer-implemented method begins by establishing, by at least one processor, a map-based game that contains a plurality of selectable units in a game board. During play, player selections are received which includes the selection of at least one unit and each player is associated with his or her selected unit. It is then determined whether the player wins a prize based on the player's selections of the unit(s) and the player is provided with access to an application which is executable by a processor. In one preferred embodiment, the application is downloaded to the computer of the player and executed, causing the application's user interface to be displayed to the player for interaction. The applications that are accessible may provide players with entertainment, advertisements, promotional information, education, social networking, games, media, utility functions, or even unlock aspects or features of the map-based game.

In another embodiment, a computer-implemented method for facilitating a map-based game includes establishing, by at least one processor at a gaming server system, a map-based game containing a plurality of selectable units in a gameboard and receiving a player selection of a unit in the gameboard. The selected unit is associated with the player and it is determined whether the player receives software object based on the unit selected. In response to this determination, the software object is caused to be automatically downloaded and processed at a computer of the player to display a user interface of the application in response.

In yet another embodiment of the present invention, a computer-implemented method for facilitating a map-based game includes the step of establishing a map-based game containing a plurality of selectable units in a gameboard. A plurality of executable applications is associated with one or more predetermined units in the gameboard, effectively distributing applications throughout the gameboard for discovery. Furthermore, player selections of one or more grid units may be received with one or more credits for play. The selected unit may then be associated with the first player. In addition, the first player is provided with access to at least one executable application in response to the step of associating.

BRIEF DESCRIPTION OF THE DRAWINGS

The present invention will now be described, by way of example only, with reference to the accompanying Figures, in which.

The attached Figures depict exemplary embodiments and are meant to be understood in view of the details disclosed herein.

DETAILED DESCRIPTION OF THE INVENTION

The following describes in detail various embodiments of the present invention. One of ordinary skill in the art would understand that standard programming and engineering techniques may be used to produce such embodiments including software, firmware, hardware, or any combination thereof to implement the disclosed subject matter.

Figure 1:
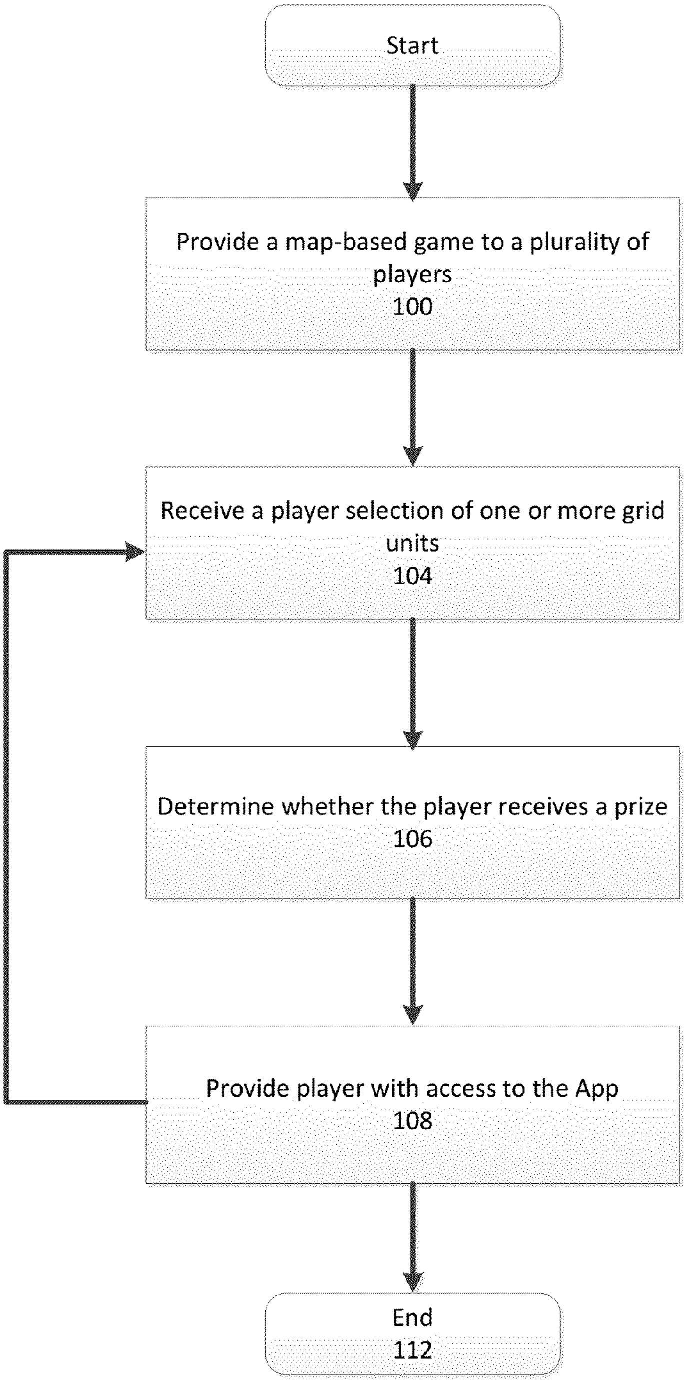
FIG. 1 depicts a flow chart illustrating an exemplary method of facilitating a map-based game containing executable Apps in accordance with one embodiment of the present invention.

FIG. 1 depicts a flow chart illustrating an exemplary method of facilitating a map-based game containing executable Apps in accordance with one embodiment of the present invention. At 100, a map-based game is provided to a plurality of players for participation. The map-based game, for instance, may be embodiments of the GeoSweep, Treasure Hunt or Free2Play games, all of which are described in related patent applications and patents and fully incorporated herein. In a typical map-based game, a grid pattern may be overlaid over a map dividing an area of land into units. While the term "grid unit" may sometimes be used herein to describe a selectable unit on the gameboard in accordance with various embodiments of the present invention, this should not be interpreted to be limiting in any way. Indeed, it is well within the scope of the present invention that the selectable (grid) units vary in shape, size, dimension, layer, color, depth, and so on. The selectable grid units may vary from one another within a gameboard or even from game to game.

Figure 2:
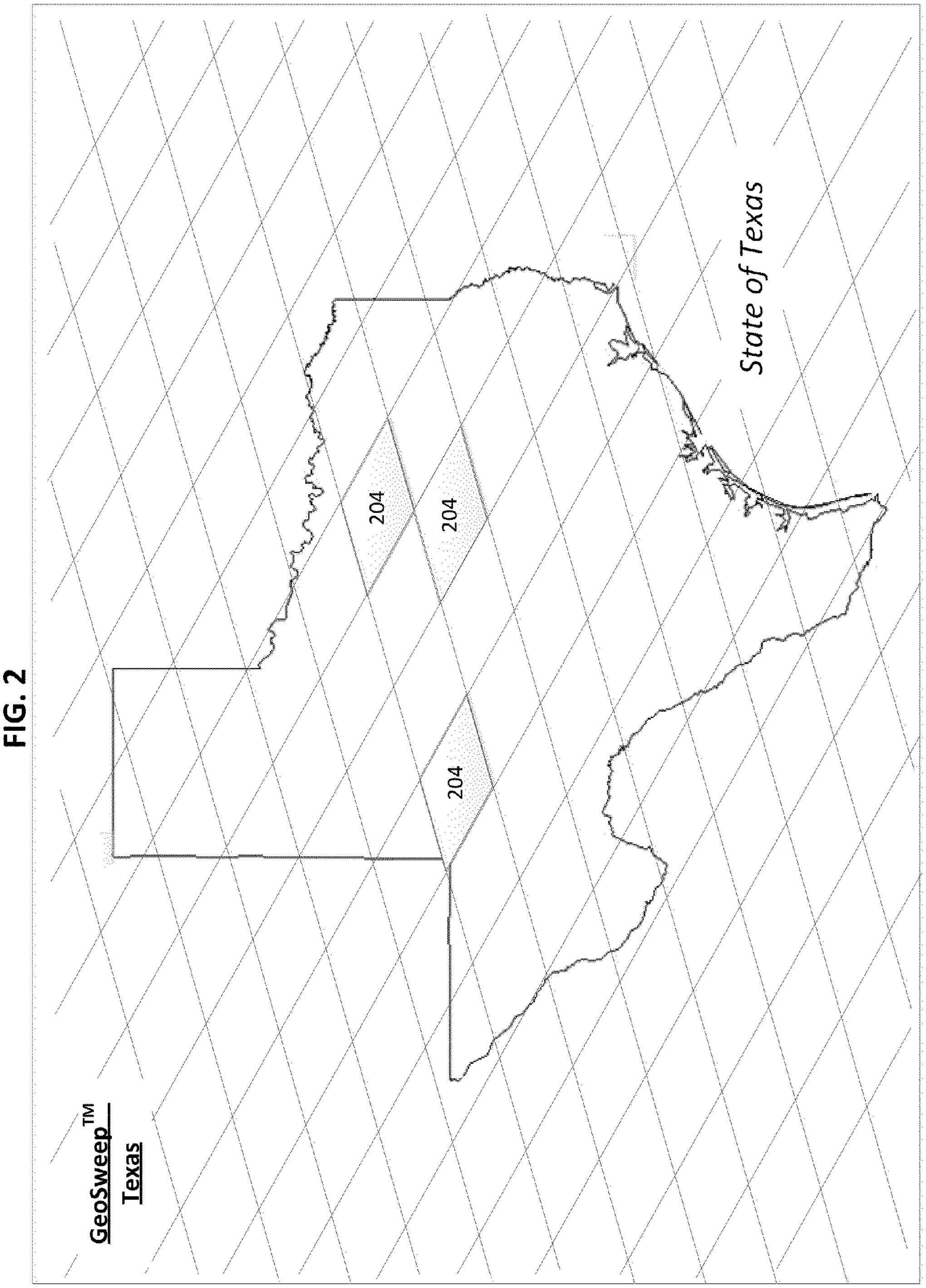
FIG. 2 depicts a user interface of a Treasure Hunt game in accordance with an embodiment of the present invention.

FIG. 2 depicts a user interface of a Treasure Hunt game in accordance with an embodiment of the present invention. In this variation of the GeoSweep game, at least one prize, or "treasure," may be hidden in a map (e.g., of Texas) containing a plurality of grid units 204. The goal of the game is for the players to find the one or more treasures hidden somewhere in the map. Generally, when the game begins, players take turns choosing grid units to determine whether that grid unit contains a prize. This continues until all of the prizes have been found on the map, whereupon the game ends.

At 104, a player selection is received containing a selection of one or more grid units on the map-based gameboard. In the Treasure Hunt game, for example, a user may select a grid unit by choosing a particular grid unit for "digging." As a result, the player's selection may be associated with the player's account.

At 106, it is determined whether the player wins. In the case of where the selected grid unit is associated with an App, the player may be awarded the App. The Apps that may be awarded may be a utility App, promotional or advertisement App, an educational App, a game App, a social networking App, entertainment App, news App, a media App or any other type or categories of software applications or objects. For instance, players may be rewarded an App that allows them to watch videos, music, podcasts, audiobooks. Another App may provide players with access to the latest news from around the world and to access their friends' social network status and profiles. As discussed in other portions of this specification, the Apps include computer executable lines of codes executable by the computer systems of the map-based game, of players and of other parties. The Apps may be developed in accordance with the software platform associated with the map-based game and, in some embodiments, may also be developed for execution on the iOS, Android, Windows Mobile, Windows, Mac OS, Linux, Unix, and/or other software platforms. In at least one embodiment, the Apps that are provided to players of the map-based game may include Apps from various application stores from other platforms, such as the Apple App Store, the Android Market, the Windows MarketPlace, the Windows Store, the BlackBerry App World, and others.

Figure 3:
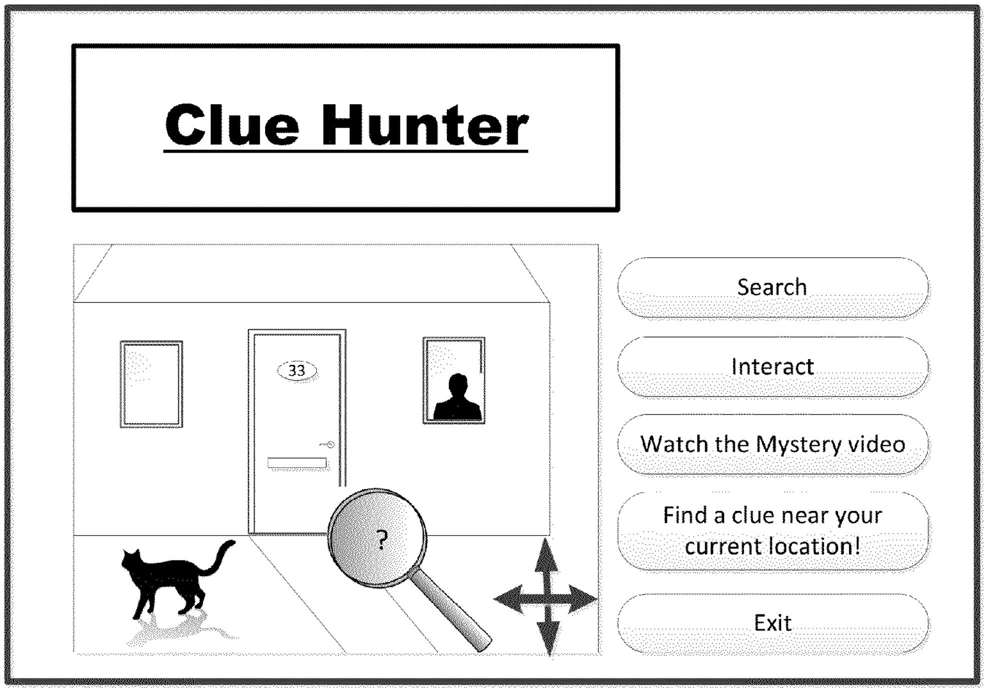
FIG. 3 depicts a user interface of an executed App in accordance with an embodiment of the present invention.
Figure 4:
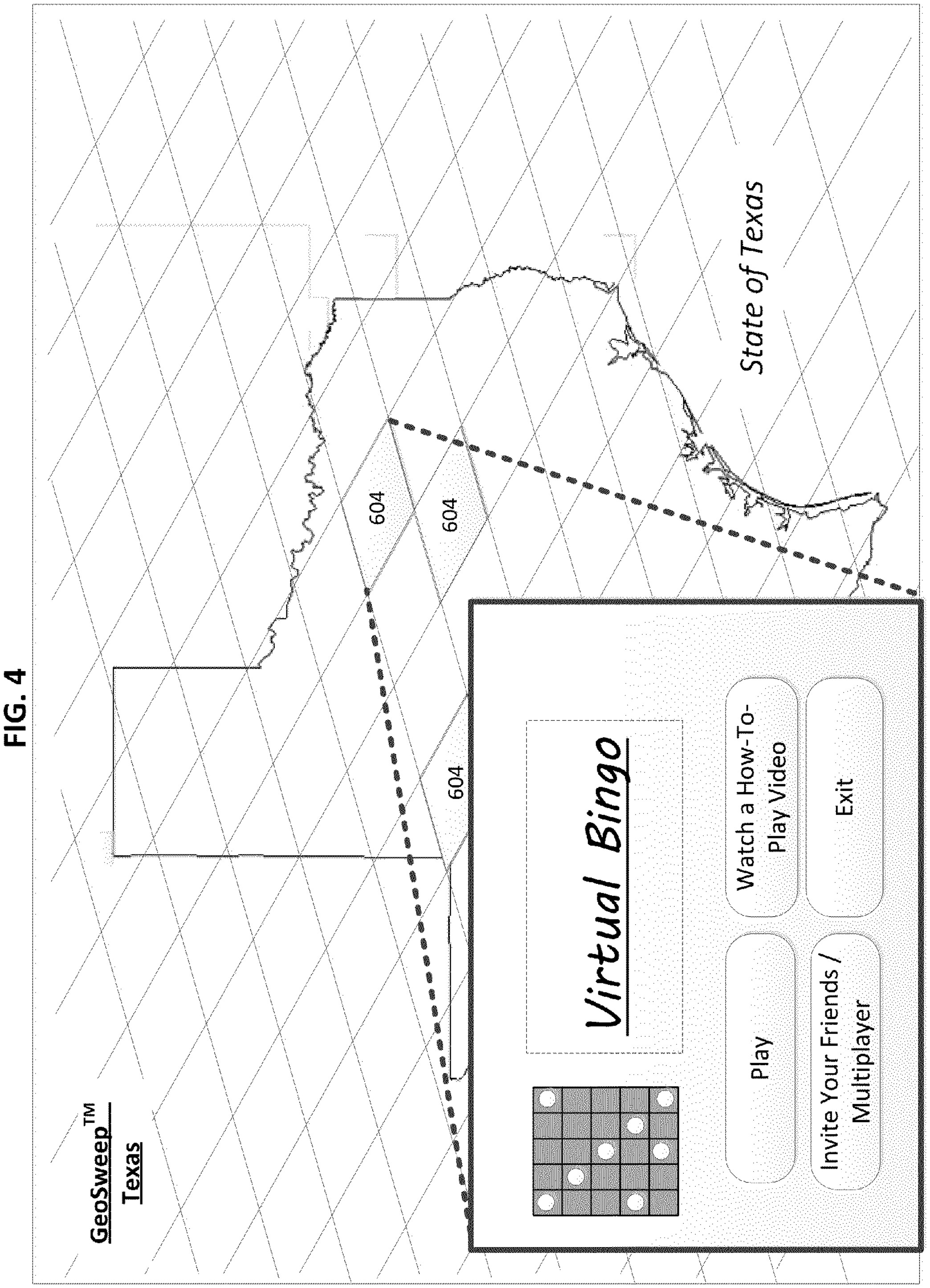
FIG. 4 depicts a user interface of an executed App that is displayed within the map-based game in accordance with an embodiment of the present invention.

At 108, the player is provided with access to an App. In the preferred embodiment, at least a portion of the computer executable lines of App code is automatically downloaded and executed by the processor of a computer platform, resulting in the display of the App's user interface to the user. For instance, FIG. 3 depicts a user interface that is displayed to the player after the he or she selects the grid unit and the executable code of the App is executed. In this example, a user interface of a game Clue Hunter is provided to the player and includes various menu options and interactive visualization that allows the player to interact with an environment, search for clues, watch a video about the mystery, and find clues in nearby real-world locations. The map-based game's user interface may be entirely replaced on the display of the computing platform by the user-interface of the App, thereby allowing the player's attention to focus fully on the App. FIG. 4 depicts another embodiment of the user interface in which only a portion of the interface displays the App is executed. In this example the user interface of the App, Virtual Bingo, takes up only a portion of the user interface shown viewable by the player. Players may interact with the map-based game, such as making additional grid unit selections, while still accessing the App and playing the game. In one embodiment, upon the selection of the grid unit by the user, the map interface may zoom into the chosen grid unit and the App displayed may be wholly contained within the grid unit. The player may save the App that the player has won for later access. In some embodiments, this step occurs automatically upon the determination that the player should be awarded an App.

After 108, the player may select additional grid units if the player still has remaining grid unit selections (at 104), whereupon the method traverses again to steps 106 to determine whether the player should be awarded an App, and so on. Else, the round or game ends at 112.

In addition to map-based games that are similar to Treasure Hunt, embodiments of the present invention also provide for map-based lottery games that are similar to that of GeoSweep or Free2Play. A player may enroll in the game by taking virtual land ownership of one or more grid units and becoming committed to participate in a series of scheduled lottery drawings. The player may participate in a lottery drawing by contributing tokens of value on behalf of at least one grid unit the player owns. During any of those drawings, if a grid unit owned by the player is selected as a (first-prize) winner, that player may receive a prize, in this case, an App. In certain embodiments, second (or third or further) prize winners are awarded Apps as consolation prizes. Other embodiments of GeoSweep, Free2Play or similar games may also be played.

Figure 5:
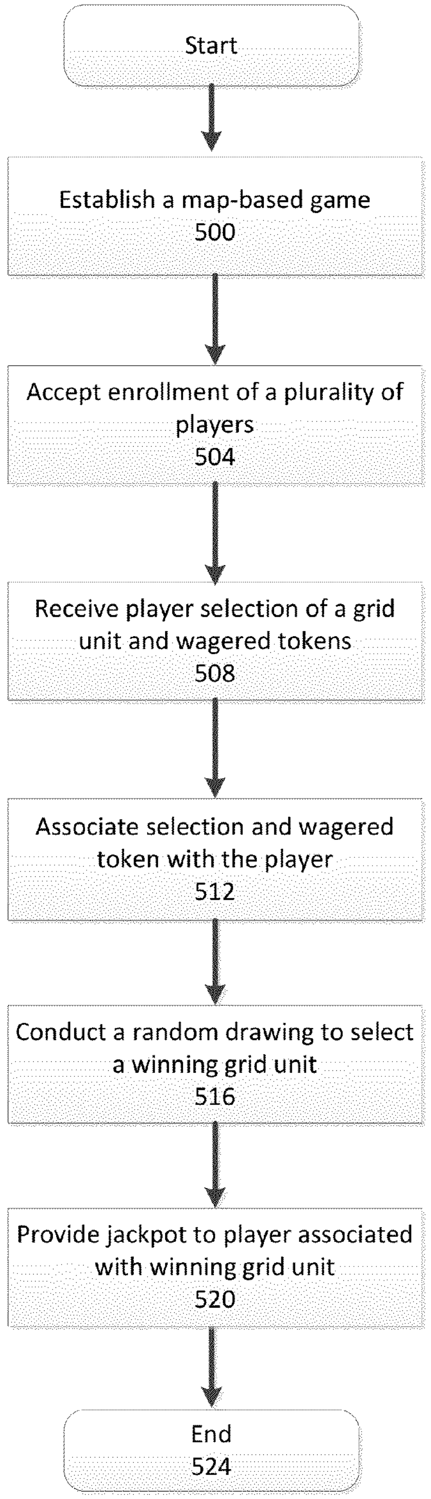
FIG. 5 depicts a flowchart illustrating a method of facilitating lottery-style games containing executable Apps in accordance with one embodiment of the present invention.

FIG. 5 depicts a flowchart illustrating a method of facilitating lottery-style games containing executable Apps in accordance with one embodiment of the present invention. At 500, a sweepstake game may be established in a similar manner to the GeoSweep™ lottery-style games disclosed in previously filed applications, incorporated herein. Next, at 504, a plurality of players is accepted for enrollment to play the game, such as by visiting a game's website and registering with the game. When a player is enrolled in the game, he or she may purchase a number of tokens to play each round of drawings. As used previously, a "token" may be or represent any physical or virtual thing of value that can be counted or quantified such as cash, credit, or simply a basic unit of monetary or virtual value that may be exchanged for services, merchandise, and general items of interests.

At 508, a player selection may be received containing information of a player's selected grid unit and the number of tokens that is wagered for that particular grid unit. In one embodiment, the more tokens the player bets, the greater the prize may be. For example, players may only win high-valued Apps if the player had placed more than a predetermined of tokens in association with the selected grid unit. After the player's tokens and selections are received, the player, at 512, is associated with the grid unit that he or she has selected with a requisite contribution of tokens.

Once it is time to conduct the drawing, which may take place on a regular or scheduled basis, one or more grid units are randomly selected at 516 to win the jackpot. At 520, the jackpot, which may include an App, is provided to the player that is associated with the winning grid unit. In addition, secondary winners, or losing players, may be provided with demo versions of the same App or may be provided with other Apps of lesser value. In embodiments in which both Apps and prizes are offered, Apps or in-App games could be offered to players who have failed to win any significant prize or a physical prize in a lottery drawing as a "second chance" to win prizes. The winning player may receive notification that the player is a winner and now has access to the App (e.g., by accessing his App library). As discussed in other portions of this specification, the App may be automatically downloaded to the player's computing device upon the determination that the player has won the App. When the player ultimately accesses his prize, he may be shown the user interface of the App (e.g., FIG. 3) automatically, allowing the player to interact with the App. At 524, the method ends.

Figure 6:
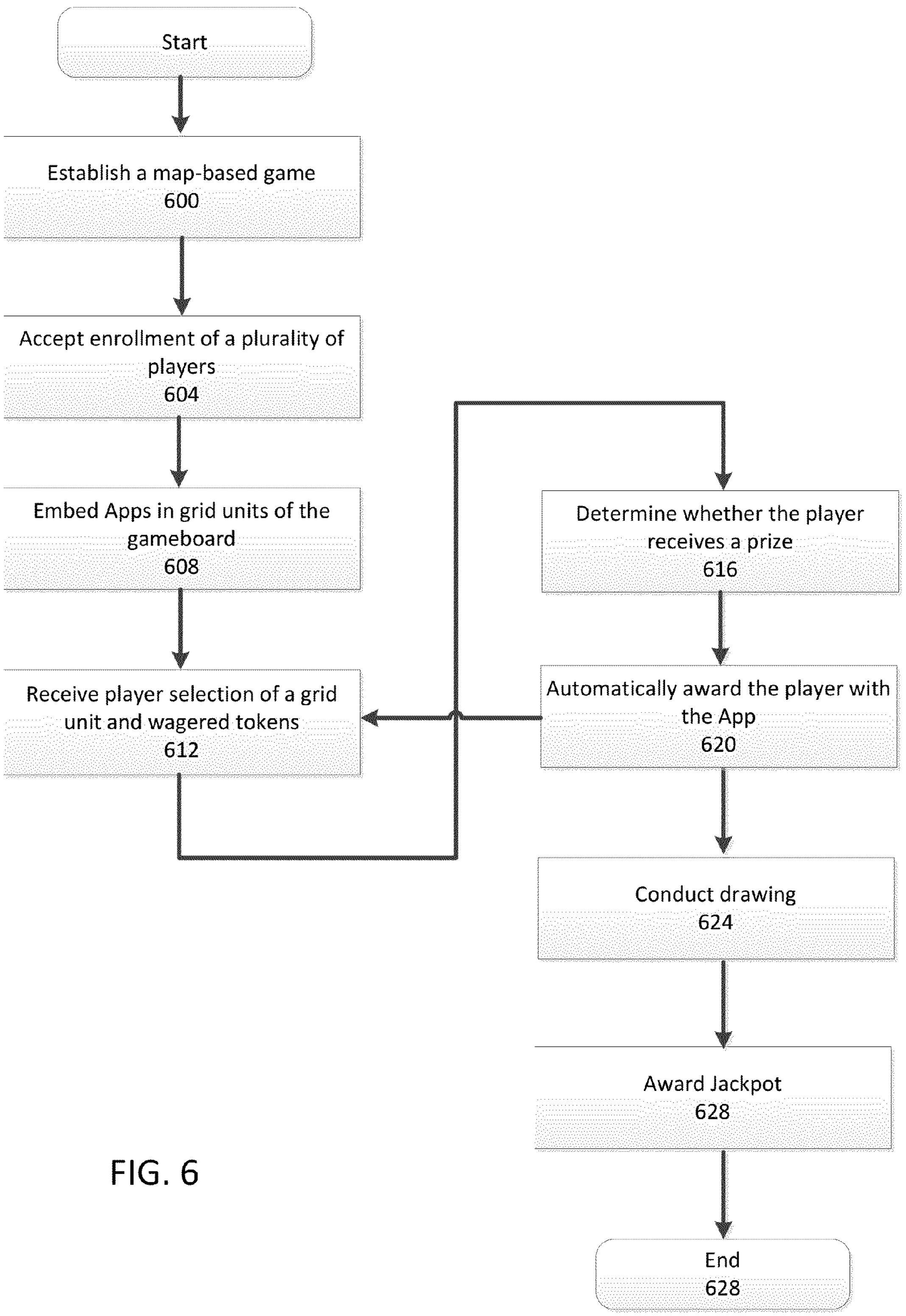
FIG. 6 depicts a flowchart illustrating another method of facilitating lottery-style games containing executable Apps in accordance with one embodiment of the present invention.

FIG. 6 depicts a flowchart illustrating another method of facilitating lottery-style games containing executable Apps in accordance with one embodiment of the present invention. At 600, a sweepstake game may be established and at 604, a plurality of players is accepted for enrollment to play the game. At 608, one or more Apps may be embedded in one or more grid units of the map. Just as with many GeoSweep games, a player may select one or more grid units and define the number of tokens that the player would like to wager on the selected grid unit. This selection, similar to the method described with reference to FIG. 5, may be received and processed at 612. At 616, it is determined whether the grid unit selection contains an embedded App. If an App is embedded in the grid unit, the player may be awarded the App automatically at 620, and at least a portion of the computer executable lines of App code is automatically executed by the processor of a computer platform, resulting in the display of the App's user interface to the user. In certain embodiments, the App may be automatically downloaded to the user's computer for future access. Additional grid unit selections by the player may be received (if any, return to 612), whereupon, it is once again determined whether the player's selected grid unit contains an embedded App (at 616). This continues until all of the enrolled players have entered all of his or her desired grid unit selections or the timeframe to enter selections has expired.

At 624, the drawing is conducted and one or more grid units from the gameboard that are at play may be selected as a winner(s). Accordingly at 628, the player associated with the winning grid unit(s) may be awarded the jackpot, which may be a monetary award, merchandise, tokens, or any other types of prizes. Indeed, the jackpot may also be or at least include one or more Apps. Where an awarded prize contains an App, the player, at 628, may automatically download the App to his or her computing device for execution. Thus, as demonstrated in this and other embodiments discussed herein, Apps may be awarded in various stages in a map-based game, thereby increasing excitement and interests from players by providing additional manners in which prizes may be won and providing additional types of prizes that may be won.

In embodiments of map-based games, a player may be required to find and select a predetermined number of grid units associated with a particular App before the player is be able to access and/or download the App. For instance, players may receive a Pirate game App by discovering at least half of the grid units that are associated with the App. The player may be provided with notice of his progress in this search. The player may also be incentivize to continue the search for the remaining associated grid units while also rewarding players for their progress, such as by offering players discounts to purchase the App with each instances of discovery as the player works toward reaching the discovery goal. For example, where the winning of the Pirate game App requires the discovery of five grid units, a player may receive a 20 percent discount on purchasing the App after having discovered one grid unit associated with the App. After discovering a second grid unit associated with the App, the player may receive a 40 percent discount off of the price of the Pirate game App, and so on. Other variations of discount and incentive methods may be used to incentivize the players to find the grid units associated with a particular App and to maintain player interests.

In one embodiment, the player may gain access to an App associated with a grid unit only upon his or her digging of all of the grid units that surround one or more grid units containing an App. Thus, by successfully digging all of the grid units surrounding an area containing one or more grid units, the player may gain access to all Apps associated with the grid units that are contained within that area. This feature may offer players a larger set of prizes in return for the greater risks he or she takes in attempting to dig an entire group of grid units that surround an entire area since, at any time, another player may disrupt the player's chances of winning by digging within the area or within the circumference that the player is attempting to complete. Alternatively, the player may be given a randomly chosen App that is embedded in a grid unit within the contained area.

Furthermore, players may receive prizes, additional Apps, or advantageous information by interacting with the Apps themselves. For example, by successful solving of puzzles, questions or tasks in the App may result in additional prizes or in-game bonuses for the players. Players may be offered in-game bonuses or prizes simply for downloading and trying a particular App. In another embodiment, the discovery of one App could provide clues for another one or more Apps hidden in the map-based gameboard. Further, the discovery and activation of an App could expand the gameboard at the edge or consolidate one's unoccupied neighboring grid units. Similarly, the game may be further enhanced when combined with Apps that only allow players to successfully dig the associated grid unit upon his or her successful completion of a task within the App. As a result, the possibility of receiving the prize App may not be automatic, introducing yet another dynamic to the map-based game as players compete against one another to receive the prize Apps. Other types of prize-awarding rules may be utilized to determine players are eligible to receive certain Apps, including those prize awarding rules disclosed in related applications. For example, an App may be awarded once all of "treasures" associated with an App spread across multiple layers of grid units are found or once all of the pieces of a puzzle are found (e.g., all of the bones of a dinosaur has been discovered).

Players may be required to visit real-world locations (e.g., a kiosk associated with the map-based game) to gain access to particular grid units that are required for access to an App. The player may have to perform certain tasks at the real-world locations. For instance, a bank sponsoring a banking App may require players to visit a branch location of the bank and connect the player's mobile phone to the bank's ATM machine or wireless network and check the player's balance or perform other banking functions in order to receive the banking App, to receive a discount to purchase the banking App or others, or receive tokens, grid units, and other bonuses.

In addition to Apps, map-based games may also provide prizes as well as Apps. In addition, additional prizes may also be awarded upon the discovery of a top-ranked or designated Apps. For example, players may be awarded a gift card for finding all of the Apps associated with a company within a particular region of the gameboard.

In embodiments of the present invention, players may have to pay for each grid unit selection. In these cases, the developers of the App may determine the price of each grid unit associated with the App. A grid unit, for example, may be priced according to the value of the App or may be randomly selected (which may offer players the chance to receive Apps at a steep discount). In certain embodiments, Apps associated with each grid unit may be visible to the player when he or she is selecting the grid units. The apps may be represented by an icon within each grid unit. In one embodiment, the icon and screenshots of the App may be hidden until a player selects the grid unit, whereupon the relevant information is displayed to the user.

Apps may be placed in the map of the map-based game in similar fashion to the prize placement algorithm of GeoSweep or Treasure Hunt games. For instance, the association of one or more Apps with one or grid units may be predetermined prior to the start of a game in a static manner (i.e., "predetermined play"). The placement of the Apps prior to each round may be random or may be based on any number of factors, including the number of players, the players' grid selection history, players' winning grid selection history, players' map scrolling or grid viewing history. For example, a grid unit may be associated with a high-value App if the grid unit is rarely chosen, viewed or otherwise rarely receives the players' interests. Furthermore, the placement of Apps may be chosen based on the players participating in the game, including information concerning their play and user interests and the information contained within player preferences and profile information.

The placement of the Apps prior to each round may also be based on sponsorship, or based on the location of the grid unit with respect to real world locations. Indeed, the placement of Apps may be based upon the geographical location associated with a particular grid unit. For instance, in a game in which the grid units each represents a particular area of a real world map—such as a city or even the entire country—an App may be associated with the grid unit that corresponds to a physical location of choice. In addition, a merchant may permanently associate an App with one or more grid unit. For instance, a grid unit corresponding to the location of the App creator's headquarter may be associated with the App. Furthermore, upon the player's selection of the grid unit, the App may cause the display of the merchant's website, blogs, twits, fan pages, or affiliates' Apps. In various other embodiments, the association of one or more Apps with one or more grid units may also depend on the real-time location of the computing platform, the location history of the computing platform, the user interests, preferences and play history, and other information. For example, the type and number of Apps embedded in each grid unit may depend on the real-time (current) location of the mobile devices of players and the location history of these mobile devices. Indeed, the association of the Apps with respect to grid units may be customized in any number of manners as an effort to increase user interests and play.

Furthermore, the availability of the GeoSweep platform may allow App developers to offer their App by scattering copies of the Apps in one or more grid units to be discovered. Therefore, during a promotional period, such as when the App is just released, a developer may scatter a number of a new App throughout a geographic area to promote the App. This may cause additional participation by players. Developers, for example, may target particular regions of the country by embedding Apps in the same region on the game map. Furthermore, Developers may also embed Apps based on attributes of players known to be interested in the grid unit and its location. For instance, where a grid unit is often selected by players in the age range of 16 to 24, an App developer may embed its game App in the particular grid unit and surrounding areas. The Apps scattered may be trial-based, discounted or full versions of the Apps.

In one embodiment, players may receive or initiate "Hot" periods in which grid unit selections may be discounted for the player and the player may have a greater chance of winning high-valued Apps. Furthermore, these "Hot" periods may provide players with access to coupons, free tokens to purchase grids and other benefits.

In at least one embodiment of the present invention, players may earn prizes by allowing Apps to be embedded into his or her grid unit. For example, in games of GeoSweep where players own particular grid units, players may receive the App for free, prizes, tokens or additional grid units by allowing developers to embed their Apps in the grid unit. On the map, other players may see that an App is available to download at the grid unit and may download the App for free or at cost. In one embodiment, a grid owner may allow developers to embed an App in the grid unit and return the grid unit for play by all other players for one or more rounds in return for free access to the App, prizes, or tokens. In effect, players may lease out their reserved grid unit for one or more rounds. In one embodiment, players may receive additional prizes or tokens based on the number of download of the App by other players.

Figure 7:
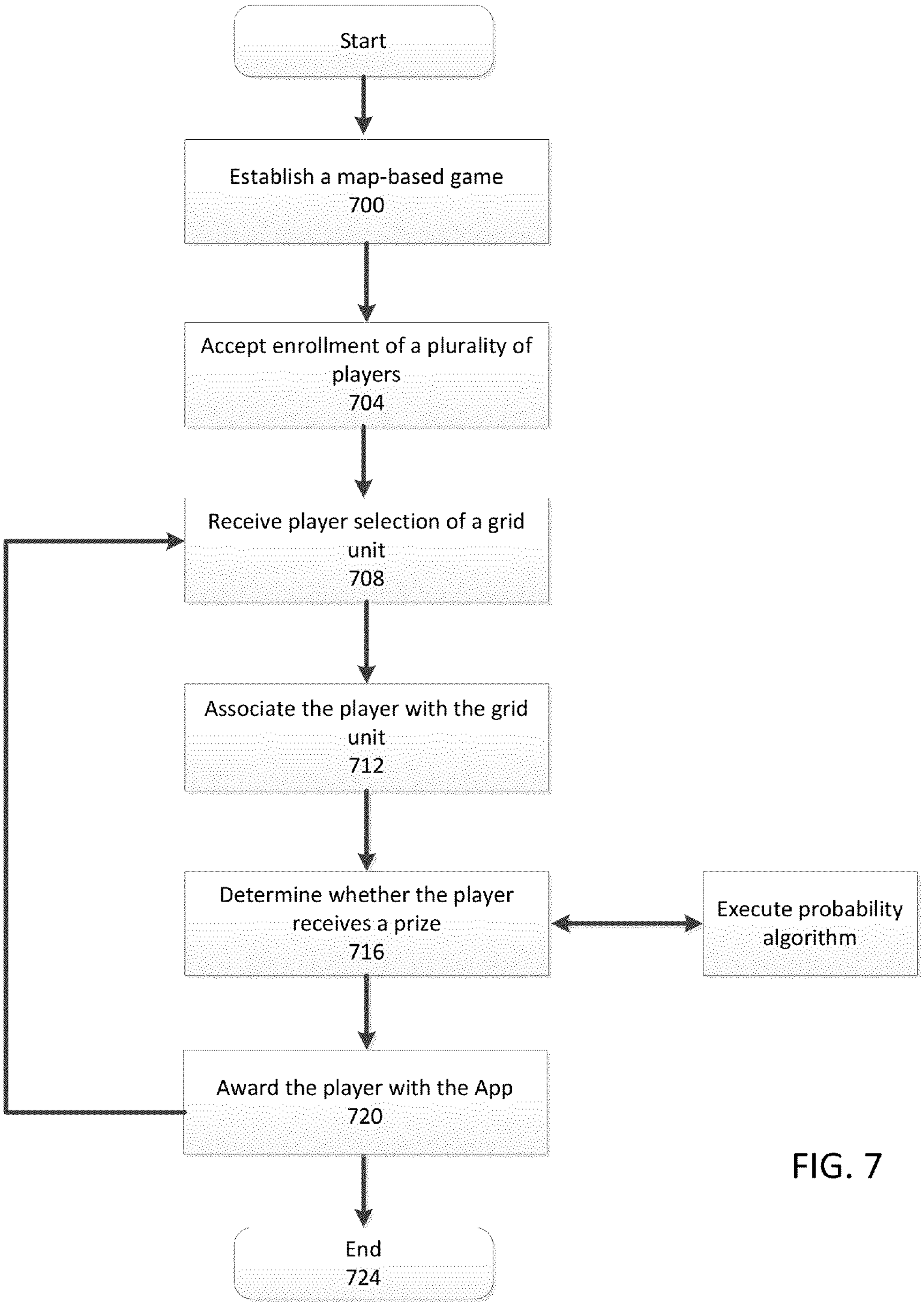
FIG. 7 depicts a flowchart illustrating a method of facilitating a dynamic play of a map-based game containing Apps in accordance with one embodiment of the present invention.

The Apps may also be dynamically embedded with one or more grid units, similar to the dynamic placement of prizes in a Treasure Hunt game (i.e., "dynamic play"). Thus, whether a grid unit is associated with a particular App may be determined by the computing platform when the player selects the particular grid unit. FIG. 7 depicts a flowchart illustrating a method of facilitating a dynamic play of a map-based game containing Apps. Similar to the previously described embodiments, an online game containing a map that includes a plurality of grid units is established at 700. Next, enrollment of a plurality of players is accepted at 704. Unlike a static play of a map-based game, the embodiments of the dynamic play game of FIG. 7 do not determine the placement of an App on the map prior to a player's interaction (i.e., prior to the start of a round). After the plurality of players is enrolled, the game begins by allowing players to select grid units. At 708, a grid unit selection may be received. Once the grid unit has been selected, the player is associated with the grid units according to 712.

After the player is associated with each of selected grid units, it is determined, at 716, whether the player wins by executing a probability algorithm. Thus, in the dynamic play of the game, it is unknown whether the player would win a prize even at the moment the player chooses a particular grid unit. It is not until the probability algorithm is executed that the results of the player's selections are known. In other words, at the start of each dynamic play game, each grid unit has a chance of containing the prize. In contrast, in the predetermined game, each tile either has a winning prize or it does not, i.e., each grid unit either has a 0% or 100% chance of containing a prize. In one basic probability algorithm, the number of not yet won Apps (P), the number of grid units not yet selected (U), and a randomly generated number (R) are considered. The random generated number (R), when generated, will be in the range, $$0<R\leq U$$

Once R has been generated, the following comparison is made to determine whether the player wins:

| | |
|---|---|
| The player receives the App if | $R \leq P$ |
| The player loses and does not receive the App if | $P < R$ |

The above-described basic algorithm may be used in a fair game, where each grid unit has the same chance of winning. In certain embodiments, the chances of winning an App may vary from grid unit to grid unit. In these games, each grid unit may be associated with predetermined winning factor, $F_w$. The value of $F_w$ may be any number greater than 0. The closer the value of $F_w$ to 1, the closer the algorithm is equivalent to the algorithm in a fair game. Further, when the value of $F_w$ is greater than 1, it is easier to win the prize. Once the value of R has been randomly generated, the determination of whether the player wins the prize may be,

| | |
|---|---|
| The player receives the App if | $R \leq F_W \times P$ |
| The player loses and does not receive the App if | $F_W \times P < R$ |

For example, where the value of $F_w$ is 2, the player has twice the probability of winning the App. When used in the map-based game, the value of $F_w$ may be known for each grid units or it may be hidden. Further, the value of $F_w$ may be represented by the size of the grid unit relative to the other grid units. A player's an association with an App may be dependent on, inter alia, player selection history, player winning/loss ratio, player type, player's logged app activation or play, or player profile parameters, or other game variables.

In various embodiments of the GeoSweep Treasure Hunt game, Apps may categorized by a plurality of tiers. Valuable Apps may be considered to be in the highest tier while Apps of less value may be considered in the lowest tier. Accordingly, Apps of the higher tiers may be more difficult to win than Apps at the lower tiers. Thus, where a high-tiered App is embedded within a grid unit, a player who selects that grid unit for play may have a lower chance of winning the App (e.g., 1 in 100 chance of winning) than if the player had selected another grid unit that contains a low-tiered App (e.g., 1 in 5 chance of winning). Thus, in an embodiment of the "dynamic play" of the map-based game, a probability algorithm may take into consideration the multiple tiers of Apps with each tier having differing probability of winning a prize. Where multiple Apps are embedded in a grid unit, each App may have a unique prize tier. In addition, in embodiments of the map-based game in which both prizes and Apps are offered, prizes may be considered to be higher in tier than Apps. In another embodiment, the tiers of Apps may be based upon the value of the App and may vary from prize to App to App. For example, Apps that may be offered for free in an App marketplace may be considered a bottom tier while Apps that may be purchased for $5 in the App marketplace may be in the same tier as a $5 gift card prize. Other probability algorithms may be used in various embodiments of the present invention, including utilizing tier adjustment factors and or other bases. Indeed, probability algorithms disclosed in related application (incorporated herein) as well as other probability algorithms may be utilized. At 720, the player is awarded an App. Additional player selections may be received, at which point, the method returns to 708. Else, the method ends at 724.

In another embodiment of the invention, some or all Apps available to be awarded to players may also be downloaded in trial mode or may be purchased in full, without playing the map-based game (e.g., without the need for player's selection and/or purchasing of the grid unit as part of gameplay in hopes of winning an App). This may not only allow the player to test the App to his or her liking but also allow players to outright buy Apps without wagering money through gameplay in hopes of winning a particularly desired App. The use of trials may also allow the player to receive additional prizes or in-game bonuses. Thus, in one embodiment, in addition to Apps hidden in grid units throughout a gameboard, there may also be various Apps spread throughout the gameboard for trial and/or purchase. Players may navigate the gameboard to browse through the Apps that are available for download in addition to navigating the map to play the map-based game.

In one further embodiment, regions of the Map may contain Apps of particular categories. Further, subregions within each region may contain sub-categories of Apps, and so on. Thus, the gameboard may contain an easily navigable App marketplace that provides players with a wide variety of Apps from which to try and buy. After selection of a particular grid unit, players may be asked whether the player would like to 1) download a trial-version of an App; 2) buy the full version of the App; or 3) select the App for play (e.g., digging or wagering for a lottery drawing).

In one embodiment, Apps may be downloaded in trial mode and only activated upon proof of the player's grid unit ownership, proof of grid unit purchases (e.g., of a certain number or type), or proof of participation in certain number of GeoSweep or related games. Various other tasks may be required to gain access to a full version of a game. Thus, in additional to the chance of trying out the App, players may convert trial version of an App to a full version upon completion of various tasks, as may be defined by developers.

As discussed briefly above, the selecting or purchasing of a grid unit may allow access to additional feature-unlocking Apps. One feature that may be unlocked is a Global Positioning System (GPS) feature that allows players to use the map-based game application with GPS information. Thus, players may receive hints or directions to treasures, nearby friends, or participating stores or merchants and may receive notification in real time. This feature may also offer players the ability to gain access to additional prizes or in-game bonuses based on the player's real-time position. As discussed with respect to the Treasure Hunt embodiment of the map-based game, the use of GPS information may allow players to visit real-world locations corresponding to grid units and receive hints of nearby hidden prizes. Similarly, players having access to this feature may be notified of nearby grid units containing hidden Apps or may receive directions to the nearest kiosk where an App may be downloaded as a prize. In addition to GPS capabilities, Apps may also grant players with access to Near-Field Communications, Radio Frequency Identifications and/or Quick Response/bar code features to be used in conjunction with the map-based game application.

In one embodiment where the map-based game application is executed on a mobile phone with a built-in camera and GPS system, the feature may allow the player to visualize prizes that are available at a particular real-world location as it relates to its corresponding grid unit and may offer hints as to the locations of prizes, or other Apps. Finally, another feature-unlocking App may facilitate the physical connection with Treasure Hunt or GeoSweep kiosks and/or devices at participating merchants, providing the player with a plurality of advantages or in-game bonuses.

In yet another embodiment, an App may provide players with access to a sharing or teaming feature that allows players of Treasure Hunt or other games to form a team and hunt for treasures in that manner. Thus, in these cases, prizes may be shared amongst the team members. An App may also grant users access to an augmented reality feature of the map-based game application.

Figure 8:
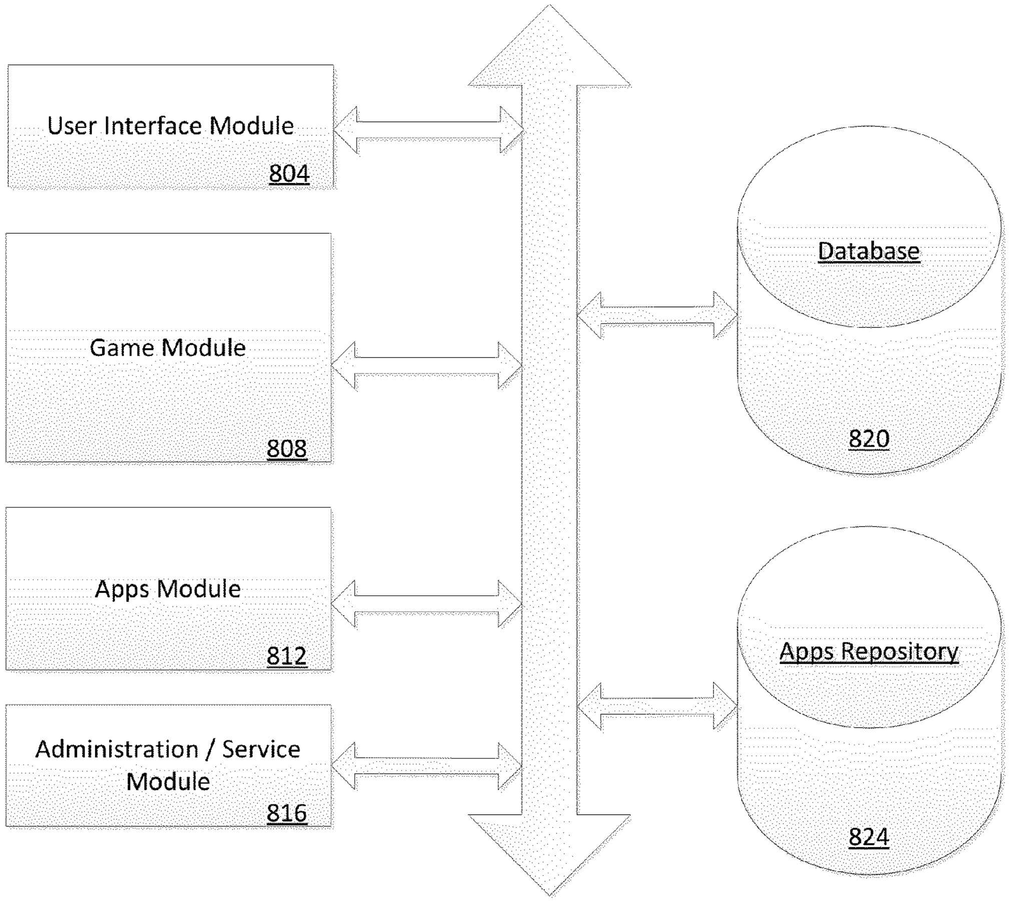
FIG. 8 is a block diagram of a system for facilitating map-based games containing executable Apps in accordance with one embodiment of the present invention.

FIG. 8 is a block diagram illustrating an exemplary system 800 for facilitating lottery-style games in accordance with one embodiment of the present invention. The exemplary modules may include a user interface module 804, game module 808, an Apps module 812, an administration/service module 816, a database 820, and an Apps repository 824. These software modules may be programmed or configured to communicate with one another or with the data-storage modules.

The system 800 may be or include a computer system. This embodiment of the present invention may be described in the general context of computer-executable instructions, such as program modules, being executed by a computer. Generally, program modules include routines, programs, objects, components, data structures, etc. that perform particular tasks or implement particular abstract data types. A series of programmable instructions may be stored in a computer-readable medium performing the lottery-style gaming functions disclosed herein and to achieve technical effects in accordance with the disclosure.

The present invention may be implemented on any computing platform. This includes any computing platforms, such as those platforms developed by Apple, Google, Research in Motion (RIM), Microsoft, Palm, HP, Samsung, HTC, and others, including mobile platforms such as iOS, Android, Blackberry, Windows Mobile, Palm OS, and other smart phone, tablet or mobile devices and/or platform platforms known in the art. It may also be implemented so as to be used on standalone computing platforms such as personal computers (PC) or laptops. The GeoSweep, Treasure Hunt or other map-based games containing the presently disclosed invention may be implemented as a standalone application, as an integrate operating system or feature of the computing device, or may be accessed via a web browser or other web-connected application. In one preferred embodiment, the present invention is implemented on a mobile smartphone such as the Apple iPhone, or other phones that support the iOS, Android, Windows Phone, RIM, or other mobile operating systems as a standalone App, as appreciated by one of ordinary skill in the art.

The components used in the present invention may be or include a computer or multiple computers. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones, PDAs, tablets, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components, including the system memory, to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in Non-Volatile Memory or, sometimes, in ROM. RAM typically contains data and/or program modules that are immediately accessible to and/or presently being operated by a processing unit. The data or program modules may include an operating system, application programs, other program modules, and program data. The operating system may be or include a variety of operating systems such as Microsoft Windows® operating system, the UNIX operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system, the Apple iOS mobile operating platform, Android mobile operating platform, Windows Mobile operating platform, Blackberry mobile operating platform, Mac OS mobile operating system or another operating system or platform.

At minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. A plurality of software processing modules may be stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable or volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Although many other internal components of the computer are not described herein, those of ordinary skill in the art will appreciate that such components and the interconnections are well known. Accordingly, additional details concerning the internal construction of the computer need not be disclosed in connection with the present invention.

The user interface module 804 may provide computer and/or Internet access for players and game operators/administrators to communicate with the other software modules. The game module 808 may facilitate the establishment, execution, and management of the map-based game. In particular, the game module 808 may perform functions related to the enrollment and management of players, including registering new players, verifying player information, assigning player IDs, creating player records, and other functions. Furthermore, the game module 808 may execute the game by providing to players a gameboard, processing player grid unit selections and wagers, determining whether a grid unit that has been selected contains an embedded prize or App, scheduling and conducting lottery drawings where applicable, generating and publishing drawing results, calculating proportional values and payout amounts, providing prizes including Apps, and other functions related to the execution and performance of the map-based game. The game module 808 may further be configured to perform accounting functions including managing player accounts, handling debit and credit transactions against the player accounts including wagers and payouts, and connecting with external financial institutions, governmental regulatory agencies, and other sources to complete or report financial transactions. The game module may further receive, store and manage data at the database 820 related to any of the aforementioned functions.

The Apps module 812 facilitates the providing of Apps to players including in relation to the play of the map-based game. The Apps module 812, for example, will operate in conjunction with the game module 808 to provide players with Apps in response to grid unit selections or lottery drawings. The Apps module 812 may further communicate with external sources to retrieve Apps for storage at the Apps repository 824.

The Apps module 812 also may be configured to determine the embedding of Apps on the gameboard (e.g., with static play) and which Apps are to be provided from the Apps repository 824 in response to particular grid unit selections (e.g., with dynamic play).

The Apps module 812 may provide the Apps in accordance to configurations set by an administrator or App developer. For example, the Apps may configured to provide a banking App in response to a user selection of a particular grid unit. In response to a player selection of this grid unit, the Apps module 812 may provide the player's computer with the network location of the App as stored within the App repository 824.

The Apps module 812 may be configured to dynamically determine the App to provide in response to grid unit selections based on any number of considerations, including: gaming rules, prize tiers, and rules and/or settings of the game and those set by the administrator. The Apps module may utilize any number of algorithms to select the optimal Apps based on player play, prize history, sponsorship events or promotional periods, and other data. For example, the Apps module 812 may embed Apps in locations of the map where players who have not recently won a prize are most likely to select a grid unit, taking into consideration previous selections and views. As another example, the Apps module 812 may embed Apps in popular locations near the desired target audiences of Apps according to targeted age groups and App interest data. Furthermore, different Apps may be won at different times of the day, week, or month based on various demographic information, App attributes, and other information. The Apps module 812 may also be configured to facilitate the approval of new Apps and new App versions received from developers in accordance with any number of quality and software operating protocols/rules and may automatically make such Apps available during gameplay where approval has been received. In one embodiment, the Apps module may facilitate the distribution of software developer kits (SDKs) with APIs and manages the interface between the system 800 and the developers.

The administration/service module 816 may facilitate administrative and customer service tasks to be performed by an operator or personnel of the map-based system. For example, the administration/service module 816 may generate one or more user interfaces through which an administrator of the map-based game system 800 may set up an instance of the map-based game, configure rules of each game, schedule drawings, configure prizes, prize tiers and payout structures, edit player data, and manage data stored in the database 820. In response to actions by the administrator through one or more of these user interfaces, the administration/service module 816 may automatically process each action automatically, making the necessary changes to the operations of the system and the data stored at the system 800 accordingly. In at least one embodiment, the administration/service module 816 may further allow the administrators to configure what Apps are available within each game instances and how the Apps are provided or accessed by players.

The database 820 may contain data records related to each player, game instances, administrative settings, game rules and other policies. Thus, the database 820 may contain data records related to each player, such as player ID, personal information, wager preferences, account settings, play history, App library and so on. Furthermore, the database 820 may contain data records related to each game instance including treasure and prize locations, lottery drawing schedule, game results, winner IDs, jackpot payouts, roller amounts and other information. Additionally, the database 820 may contain administrative settings that may control the operations of the game and the interaction and capabilities of players, including data related to the prizes, prize tier configurations, payout rules, privacy settings, social networking limitations and features, login requirements, and other information. In certain embodiments, the database 820 may further contain data related to the operations of the game in general such as whether the game operates as a GeoSweep, Treasure Hunt, Free2Play or combination of these games, including whether certain features, such as the previously disclosed $2^{nd}$ chance feature, is part of the game.

The Apps repository 824 stores Apps at the system 800. In one embodiment, the Apps repository 824 may store multiple versions of each App and may contain a database of all Apps stored therein including metadata information of each App. The Apps repository 824 may further contain a log of all activity within the database including access, download, update and modification history.

Figure 9:
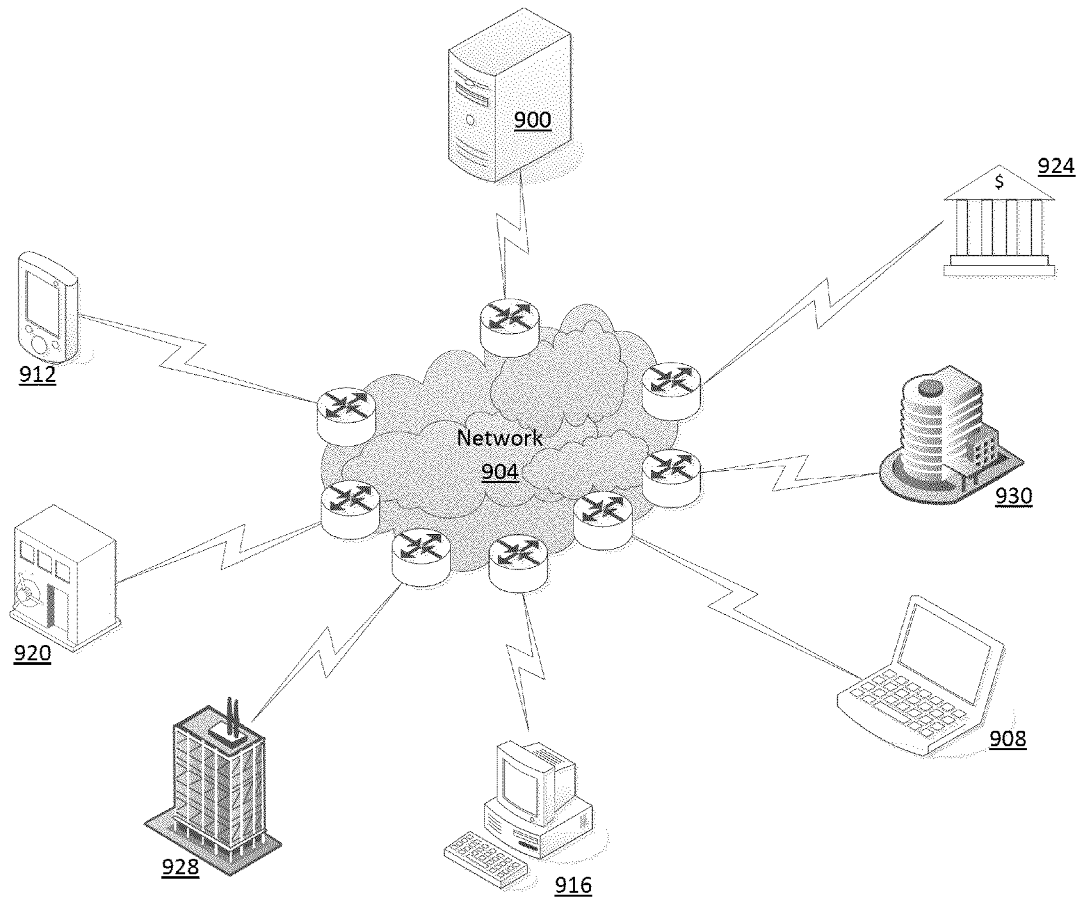
FIG. 9 depicts a block diagram illustrating the operating environment of a system for facilitating map-based games containing executable Apps in accordance with an embodiment of the present invention.

FIG. 9 depicts a block diagram illustrating the operating environment of a system for facilitating lottery-style games in accordance with an embodiment of the present invention. The system 900 may be similar to the system 800 of FIG. 8 and may contain some or all of the modules of system 800 as well as other modules. The system 900 is connected to a network 904, which further connects to various network-accessible systems, including player computer 908, player mobile device 912, administration terminal 916, financial institution/service 920, regulatory agency 924, and developer systems 928 and 930.

Network 904 may be made up of one or more computer networks and made including a wired or wireless local area network (LAN) and a wide area network (WAN), wireless personal area network (PAN) and other types of networks. In the preferred embodiment, network 904 may include or at least connect to the Internet and the World Wide Web. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocols. Furthermore, components of the system may communicate through a combination of wired or wireless paths. Indeed, various networks may be implemented in accordance with embodiments of the invention.

Player computer 908 and player mobile device 912 may be computing devices that allow players to access the map-based game provided by the system 900 over network 904. Player computer 908 may be any computing devices 908 well known in the art that allows players to interact with the system 900 in playing the game, such as selecting grid units and interacting with Apps, including personal computers, laptops, multiprocessor systems, microprocessor-based systems, minicomputers, mainframe computers and others. Player mobile device 912 may include hand-held wireless devices such as mobile phones, PDAs, tablets, programmable consumer electronics, and the like. Player computer 908 and player mobile device 912 may further contain one or more interfaces that allow for the computer and device to communicate with system 900 and other network-connected system, such as a network interface that allows for the computer 908 and device 912 to connect to the network 904. The computer 908 and player module 912 may further contain storage devices to store game data as well as downloaded Apps.

While in the preferred embodiment, the player computer 908 and player mobile device 912 include screens in which the players may register for the map-based game, view the gameboard and Apps, and otherwise interact with the system 900, this is not required in at least one embodiment of the present invention in which players may utilize audio cues (e.g., via speaker or headset) or physical cues (e.g., braille interface) to interact with the game. In at least one embodiment, players may also access the map-based game provided by the system 900 by using one or more terminals locally connected to the system 900 or at network-connected terminals at various locations such as at casinos, shopping malls, airports and other locations.

Administration terminal 916 allows administrators to connect to the system 900 to configure rules and settings related to the map-based game. The administrator terminal 916 may be a computing device such as a terminal computer system or may be a mobile device.

Indeed, the administration terminal 916 may be any network accessible computer device. In one preferred embodiment, an administrator may configure the rules and settings of the map-based game and the system 900 by using a web browser to log into the system 900. The administration terminal 916 may connect to the system through a network such as network 904, or may connect directly or locally with the system 900 as well.

Financial institution/service 920 may include computer systems operated by financial institutions (e.g., banks) as well as those who facilitate payment (e.g., credit card companies, and Internet money payment/transfer services). Thus, in at least one embodiment, system 900 may automatically connect to the financial institutions/service 920 to report and complete financial transactions such as to transfer prize money or to charge a player's credit card account after a player purchase. Regulatory agency 924 may include computer systems of government agencies and other regulatory bodies. For example, regulatory agency 924 may be computer systems operated by a state's gaming control board or the United States Internal Revenue Services (IRS). Thus, in at least one embodiment, the system 900 may automatically report out gaming results to each state's gambling and gaming control boards and/or agencies in accordance with local, federal, and international gaming laws. The system 900 may automatically generate reports in accordance with reporting requirements. Furthermore, the system 900 may automatically connect to the IRS to report player winnings to the agency. In one embodiment, the system 900 may automatically generate winnings report and receipts for players for use in their tax returns.

Developer systems 928 and 930 may be computer systems operated by software developers who develop or maintain Apps provided to players of the map-based game. The system 900 may connect with developer systems 928 and 930 to retrieve and/or provide access to Apps for players.

Figure 10:
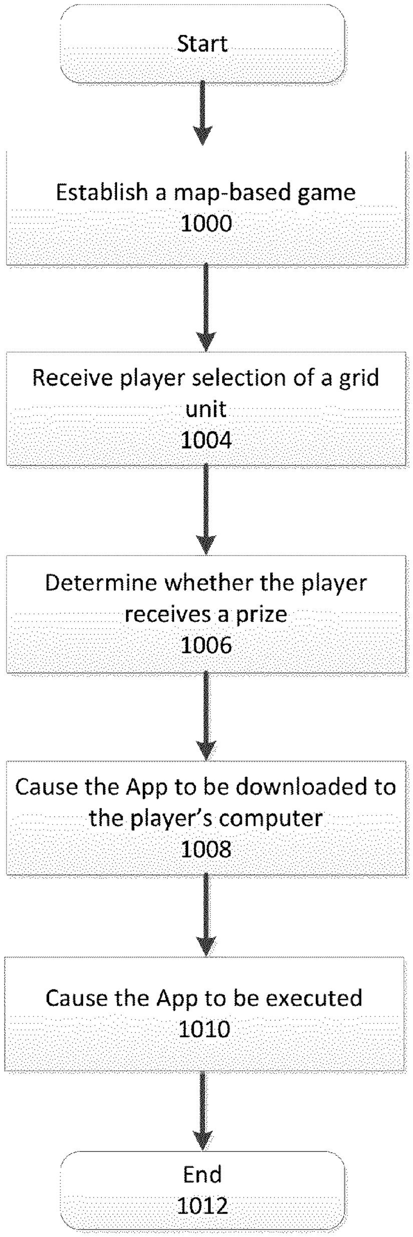
FIG. 10 depicts a flow chart illustrating an exemplary method of facilitating a map-based game containing executable Apps in accordance with one embodiment of the present invention.

FIG. 10 depicts a flow chart illustrating an exemplary method of facilitating a map-based game containing executable Apps in accordance with one embodiment of the present invention. The steps taken may be taken by the system 900 of FIG. 9. At 1000, the system 900 provides a map-based game to a plurality of players who access the game by using network-connected devices such as player computer 908 and player mobile device 912. For example, players may access the game through a web browser or through an application installed on the computer 908 or device 912.

At the start of an instance of the game, players may select one or more grid units on the map-based gameboard associated with one or more Apps at 1004 by using the computer 908 and player mobile device 912 to make their selections of one or more grid units. At 1006, the system 900 may determine whether any selected grid units contains an embedded App. At 1008, the App may be downloaded to the player's computing device. For example, system 900 may communicate the address location of the App to the player computer 908. The player computer 908, receiving the address location, may connect directly to developer systems 928 or developer system 930 to download the App code. In at least one embodiment, system 900 includes one or more databases containing information of every App available in the map-based game, including the network locations from which the App may be retrieved.

In one embodiment, player computer 908 may download the App code from an App repository at system 900 and may provide players with the App. Indeed, in one embodiment, system 900 retrieves Apps from sources such as developer system 930, other systems connected to network 904 or from local sources and stores the App in an App repository managed by the system. In one further embodiment, popular Apps may be stored at the App repository as a cache mechanism while less frequently accessed Apps may be retrieved from the App source upon need. Alternatively, in response to a request for a less-frequently utilized App, addresses of the external App source may be provided instead.

In response the player computer 908 may automatically download the App code and store the App's code locally at computer 908 and at 1010, the App is executed. Each of the grid units of the map-based game may be associated with the computer-executable lines of code of one or more Apps.

The App may be made of one or more lines of codes that may be executable by a processor at a computing platform. Any suitable programming language may be used in accordance with the various embodiments of the invention. Illustratively, the programming language used may include assembly language, ActionScript, Ada, APL, BASIC, C, C#, C++, COBOL, dBase, Forth, FORTRAN, Java, Modula-2, Pascal, PHP, Prolog, REXX, Scala, and/or JavaScript for example. Further, it is not necessary that a single type of instruction or programming language be utilized in conjunction with the operation of the systems and methods of the invention. Rather, any number of different programming languages may be utilized as is necessary or desirable. Further, as discussed below, an App may make use of functions defined by an application programming interface (API) of the map-based game application. In one embodiment, these applications are Adobe-Flash-based applications while in another embodiment they may be "extensions" to the map-based game application.

App may be downloaded prior to the user's selection of the grid unit. For example, the App may be downloaded when: the map-based game was downloaded to the computing platform; while the player is actively playing the game; while the computing device is idle; when the player selects a grid unit that is proximately located to the grid unit containing the App; or when the player clicks on one of a group of tiles that together make the App. Parts or the entire App may, in certain embodiments, be wholly embedded into the map-based game application. Other possible manners to download the Apps so as to facilitate the retrieval and execution of the App by the processor are well within the scope of the present invention. Once the computing platform has downloaded an App, it may store the App in memory for later retrieval and cached in manners well known in the art for rapid retrieval and execution of the App upon the players' selections.

In at least one embodiment, each grid unit is associated with at least one or more links, scripts, and/or pointers associated with a particular App, as understood by one of ordinary skill in the art. When the user selects the grid unit containing the link(s), script(s), or pointer(s), the computing platform may process and/or execute underlying codes, causing the loading of the App that is previously stored in memory to be executed by the processor. In other embodiments, the execution of the link(s), script(s), or pointer(s) may cause the computing platform to connect to one or more servers on a network, such as the Internet, in order to download or retrieve at least a portion of a code module of the App. Upon retrieval of the code module of the App, the code module may be automatically executed by the processor. Thus, in these embodiments, the Apps may not be downloaded to the computing platform until the grid unit is selected by the player.

The system 900 may further receive additional grid unit selections from the players, whereupon, it once again determines whether there is an App embedded in the grid unit and provides the grid unit with the link accordingly, and so on. At 1012, the game ends.

In addition, rather than downloading or executing an App, the activation of the link(s), script(s), or pointer(s) of one or more grid units may cause the unlocking of a feature or portion of the GeoSweep game that was previously inaccessible to the player. These features of the game may have been concurrently downloaded to the computing platform with the map-based game application as an inaccessible (i.e., "locked") feature. The selection of a particular grid unit associated with these features may allow the user to gain access to the Global Positioning System (GPS) feature, Near-Field Communication (NFC) feature, and other features of the map-based game application discussed previously.

In one embodiment of the present invention, the Apps of the presently disclosed invention are executed and their user-interface displayed entirely within the GeoSweep software on the computing platform. In particular, the Apps are downloaded, executed, and processed entirely by the GeoSweep application and may take place entirely at system 900 or entirely at player computer 908 (or device 912). For example, the Apps may be Adobe Flash-based or may be application "extensions" that may be properly retrieved, processed and executed by the map-based game application. The Apps may be developed by any software developer according to a software developer kit (SDK), for example, provided by owner of the map-based gameboard platform that contains therein application programming interfaces (APIs) that may be called upon by the Apps to access functions available in connection with the map-based game application. The SDK may further include software rules and coding conventions. Together, the SDK, API and programming conventions may allow developers to create Apps that gather information about the player, the current game, or the currently selected grid unit, and manipulate the information in various manners. As discussed in more detail below, an App, for example, may gather the player information to configure an in-app game. According to the performance of the player within the game, the App may then cause GeoSweep-based prizes or bonuses to be awarded to the player after the player returns to the GeoSweep game. Thus, the use of standard SDK, API and programming conventions allow for limitless numbers and types of Apps, allowing the user to access any number of games, media, information, features, and functions. The Apps may be pre-approved by the owner of the map-based game platform before being allowed to be associated with one or more grid units in order to maintain a proper level of quality and security within the application marketplace and the game environment.

In another embodiment of the present invention, the Apps may be software applications that are entirely separate from that of the map-based game (hereinafter referred generally as "external Apps"). Thus, in these cases, the selection of a grid unit, which may contain link(s), script(s), or pointer(s), may cause the retrieval, download, and/or execution of the external App. In such cases, the map-based game application may be closed and the external App may be initiated on the player computer 908 as a response to a player selection. Information similar to that described above may be transmitted from the GeoSweep software to the App. Once the player has used the App and has accumulated prizes, the original GeoSweep software may be called by the computing platform and information may be passed back to the game for processing. These external Apps may be executed as a standalone application as well, without the need to initially access the map-based game application in order to select the App.

In one embodiment, the present invention is implemented as part of a web browser-based version of GeoSweep, which may be used on any and all computing platforms. The browser may access a web page of the GeoSweep game, thereby allowing the player to directly play the game and interact with the grid units. In these embodiments, each grid unit may be associated with one or more Apps similar to other implementations of the present invention. However, in these embodiments, each grid unit may contain link(s), script(s), or pointer(s) that, when activated, cause the retrieval of at least a portion of the App and the depiction of the App's user interface within the browser. The App may be embedded seamlessly into the user-interface of the map-based game as shown in the web-browser. In one embodiment, the link(s), script(s), or pointer(s) directs the player to a webpage containing the App. In similar fashion, the player may interact with the App contained in the webpage and information concerning the game, players, grid units, prizes, in-App results, may be passed between the GeoSweep webpage and the App webpage.

In one aspect of the Apps, the Apps may connect to third party servers in order to download additional content including in-app content, games, advertisements, media, or additional in-app functions. This may take place prior to the users selection of the grid unit associated with the App, during the user's interaction with the App, or after the user returns to the GeoSweep game from the App.

In another embodiment of the present invention, software developers may connect to the system 900 to configure the delivery of Apps within any number of map-based games provided by the system. Developers may use an API to access the system 900 and configure the Apps that are to be provided, the App distribution algorithm, the probability algorithms, the Apps targeting settings, and other settings which may allow the developer to customize the play of the game and the distribution of Apps. Developers may also use the API to set App price, trial or promotional periods, and other business-related actions.

It may be appreciated by those skilled in the art that the map-based gameboard (e.g., in GeoSweep games) is a versatile platform for deploying, distributing, hiding, embedding, linking, displaying, executing, promoting, or awarding software objects or applications, with abundant opportunities to serve various commercial or non-commercial purposes. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the patent claims ultimately issued from this applicahtion.

The invention claimed is:

1. A computer-implemented method for facilitating a map-based game, the method comprising:

establishing, by at least one computer processor, the map-based game containing a plurality of selectable units on a gameboard, the gameboard being accessible by a first player using a computing device;

selecting, using the at least one computer processor, a software application from a software application repository, the software application repository storing a plurality of software applications;

associating the selected software application with at least one selectable unit on the gameboard;

receiving from the first player a selection of at least one unit on the gameboard;

storing the selection in non-transitory memory;

associating the at least one selected unit with the first player;

determining, by the at least one computer processor, whether the first player wins a prize based on the selection of the at least one unit; and providing the first player with access to the software application as the prize in response to the step of determining, a portion of said software application capable of running on the computing device.

2. The computer-implemented method for facilitating a map-based game of claim 1, further comprising the steps of:

retrieving the software application from an application server system; and storing at least a portion the software application at the computing device.

3. The computer-implemented method for facilitating a map-based game of claim 1, wherein said step of providing comprises the step of automatically executing the software application stored in the application repository, said execution causing a user-interface of the software application to be displayed to the first player.

4. The computer-implemented method for facilitating a map-based game of claim 3, wherein the user-interface of the software application is displayed within a user-interface of the map-based game.

5. The computer-implemented method for facilitating a map-based game of claim 1, wherein the map-based game is a lottery -style game that is scheduled to have a number of drawings, said method further comprising the step of conducting a drawing, among at least a portion of the plurality of units on the gameboard, to select at least one winning unit to win a jackpot.

6. The computer-implemented method for facilitating a map-based game of claim 5, wherein the jackpot includes the software application.

7. The computer-implemented method for facilitating a map-based game of claim 5, wherein the first player does not win the jackpot.

8. The computer-implemented method for facilitating a map-based game of claim 1, wherein said determination of whether the first player wins a prize is based on the selection of the at least one unit on the gameboard and the placement of the software application in hidden association with the one or more predetermined units on the gameboard, said method further comprising the step of:

placing the software application in hidden association with one or more predetermined units on the gameboard.

9. The computer-implemented method for facilitating a map-based game of claim 1, wherein the determination of whether the first player wins a prize is based on the selection of a plurality of units associated with the software application.

10. The computer-implemented method for facilitating a map-based game of claim 1, wherein the determination of whether the first player wins a prize is based on the selection of a plurality of grid units, said selected plurality of grid units surrounding at least one unit associated with the software application.

11. The computer-implemented method for facilitating a map-based game of claim 1, wherein the determination of whether the first player wins a prize is based on a probability calculation.

12. The computer-implemented method for facilitating a map-based game of claim 11, wherein the probability calculation takes into consideration gameplay history of the map-based game.

13. The computer-implemented method for facilitating a map-based game of claim 1, wherein the software application is accessible externally from the map-based game.

14. The computer-implemented method for facilitating a map-based game of claim 13, wherein the software application is accessible through a web-browser at a user computer.

15. The computer-implemented method for facilitating a map-based game of claim 1, wherein the software application is:

a utility software application;

a promotional software application;

an advertisement software application;

an educational software application;

an entertainment software application;

a social networking software application;

a media software application; or a game.

16. The computer-implemented method for facilitating a map-based game of claim 1, wherein the software application is an interactive game, said method further comprising the step of:

receiving a gameplay result to a play of the interactive game;

providing the first player with a prize in accordance with the gameplay result.

17. The computer-implemented method for facilitating a map-based game of claim 16, wherein the prize is associated with the map-based game.

18. The computer-implemented method for facilitating a map-based game of claim 1, wherein the execution of the software application causes the unlocking of a feature of the map-based game.

19. The computer-implemented method for facilitating a map-based game of claim 18, wherein the unlocked feature includes access to at least one of the following capabilities:

Global Positioning System (GPS);

Near-Field Communications (NFC);

Radio Frequency (RF) communications;

Quick Response (QR) processing;

bar code processing;

sharing; and virtual reality.

20. The computer-implemented method for facilitating a map-based game of claim 18, wherein the unlocked feature provides the first player with information related to a location of one or more prizes.

21. The computer-implemented method for facilitating a map-based game of claim 18, wherein the unlocked feature allows the first player to connect a computer system or device associated with the map-based game, said method further comprising the step of:

receiving a player connection with the computer system or device;

providing a prize or gameplay information in response to the connection.

22. A computer-implemented method for facilitating a map-based game, the method comprising:

establishing, by at least one processor at a gaming server system, a map-based game containing selectable units on a digital gameboard;

associating software objects with at least some of the selectable units on the digital gameboard, wherein the software objects are stored at a central software repository;

receiving from a player a first selection of a unit on the gameboard;

storing the first selection in non-transitory memory;

associating the selected unit with the player;

determining, using at the at least one processor at the gaming server system, whether the player receives the one or more software objects based on the selected unit;

causing at least one of the one or more software objects to be automatically downloaded at a computer of the player as a prize; and causing the at least one software object to be processed at the computer of the player to display a user interface of the at least one software object in response to the step of determining.

23. The computer-implemented method for facilitating a map-based game of claim 22, further comprising the step of providing to the computer of the player with a network location of the one or more software objects.

24. The computer-implemented method for facilitating a map-based game of claim 23, wherein the network location includes the network address of a developer server system.

25. The computer-implemented method for facilitating a map-based game of claim 23, wherein the network location includes the network address of an application repository at the gaming server system.

26. The computer-implemented method for facilitating a map-based game of claim 22, wherein the at least one software object is downloaded at the computer of the player prior to the step of receiving the first selection or prior to the step of determining whether the player wins the prize.

27. The computer-implemented method for facilitating a map-based game of claim 22, wherein the at least one software object is downloaded at the computer in response to receiving a selection of a second unit proximately located to the first unit.

28. A computer-implemented method for facilitating a map-based game, the method comprising:

establishing, by at least one processor, a map-based game containing a plurality of selectable units on a gameboard accessible by a first player using a computing device;

selecting a software application from a software application repository;

associating the software application with one or more predetermined units in the gameboard;

receiving from the first player at least one credit and a selection of a unit on the gameboard;

associating, using the at least one processor, the selected unit with the first player;

providing the first player with access to at least one of the software applications as a prize in response to the step of associating.

29. A computer-implemented method for facilitating a map-based game of claim 28, wherein the software applications associated with the one or more predetermined units in the gameboard are visible to the first player.

30. A computer-implemented method for facilitating a map-based game of claim 28, wherein the map-based game is a lottery-style game containing a plurality of drawings, said method further comprising the steps of:

executing the map-based game by doing the following in connection with each drawing:

conducting a drawing, among at least a portion of the plurality of units on the gameboard, to select at least one winning unit to win a jackpot, and providing the jackpot to at least one player associated with the at least one winning unit.

* * * * *